United States Patent
Adami

(10) Patent No.: US 10,618,242 B2
(45) Date of Patent: Apr. 14, 2020

(54) SINGLE FACER FOR PRODUCING SINGLE FACE CORRUGATED PAPERBOARD, AND RELATED METHOD

(71) Applicant: Guangdong Fosber Intelligent Equipment Co., Ltd., Foshan (CN)

(72) Inventor: Mauro Adami, Viareggio (IT)

(73) Assignee: Guangdong Fosber Intelligent Equipment Co., Ltd., Foshan, Guangdong Province (CN)

( * ) Notice: Subject to any disclaimer, the term of this patent is extended or adjusted under 35 U.S.C. 154(b) by 0 days.

(21) Appl. No.: 16/151,570

(22) Filed: Oct. 4, 2018

(65) Prior Publication Data

US 2019/0105866 A1 Apr. 11, 2019

(30) Foreign Application Priority Data

Oct. 5, 2017 (IT) .............................. MI2017A1820

(51) Int. Cl.
*B31F 1/28* (2006.01)
*B32B 7/12* (2006.01)
*B32B 29/08* (2006.01)

(52) U.S. Cl.
CPC .......... *B31F 1/2854* (2013.01); *B31F 1/2818* (2013.01); *B31F 1/2863* (2013.01); *B31F 1/2877* (2013.01); *B31F 1/2804* (2013.01); *B32B 7/12* (2013.01); *B32B 29/08* (2013.01)

(58) Field of Classification Search
CPC .................................................... B31F 1/2854
See application file for complete search history.

(56) References Cited

U.S. PATENT DOCUMENTS

| | | | |
|---|---|---|---|
| 4,251,313 A | 2/1981 | Abe | |
| 4,368,094 A | 1/1983 | Mayer et al. | |
| 4,581,095 A | 4/1986 | Schommler et al. | |
| 4,618,394 A | 10/1986 | Hoffmann | |
| 8,714,223 B2 | 5/2014 | Adami et al. | |
| 2002/0091056 A1* | 7/2002 | Lemke | B31F 1/26 493/463 |

FOREIGN PATENT DOCUMENTS

EP 0092079 A1 10/1983
GB 2170831 A 8/1986

* cited by examiner

*Primary Examiner* — Barbara J Musser
(74) *Attorney, Agent, or Firm* — Breiner & Breiner, L.L.C.

(57) ABSTRACT

A single facer including a first corrugating roller with a first rotation axis and a second corrugating roller with a second rotation axis. The two corrugating rollers form a corrugating nip, through which a paper sheet passes. The single facer also includes a pressing member, co-acting with the second corrugating roller and forming a pressure nip therewith, as well as a glue applicator co-acting with the second corrugating roller. With the second corrugating roller a suction box is associated, extending approximately parallel to the second rotation axis of the second corrugating roller and defining a suction area around the second corrugating roller. A series of laminar members, each of which is inserted in a respective one of the annular grooves of the second corrugating roller, are arranged between the pressing member and the first corrugating roller and extend in the respective annular grooves towards the suction box.

39 Claims, 5 Drawing Sheets

SINGLE FACER FOR PRODUCING SINGLE FACE CORRUGATED PAPERBOARD, AND RELATED METHOD

FIELD OF THE INVENTION

The present invention relates to the field of corrugated paperboard production. In particular, the invention relates to improvements to single facers for producing single face paperboard, and related methods.

BACKGROUND TO THE INVENTION

For producing corrugated paperboard, so-called single facers are used that, through an arrangement of corrugating rollers and gluing members, convert two smooth paper sheets into a single face corrugated paperboard, formed by a fluted paper sheet and a smooth paper sheet, also called liner.

For producing a continuous single face corrugated paperboard, two continuous paper sheets are fed to the single facer. The first sheet is fluted by means of a pair of corrugating rollers, each of which is provided with flutes or teeth and meshing with each other at said teeth or flutes in a corrugating nip. The first sheet is corrugated by passing through the corrugating nip. Downstream of the corrugating nip, a glue applicator applies glue to the crests of the flutes formed on the corrugated first paper sheet. Once glue has been applied, the first paper sheet is bonded to the smooth second paper sheet, exerting a sufficient pressure by means of a pressing member, usually a roller, pressing against one of the corrugating rollers and forming a pressure or gluing nip therebetween. In this way, the so-called single-face corrugated paperboard is obtained, which is formed by the corrugated sheet bonded to the smooth sheet or liner.

One of the critical aspects in the operation of single facers is that the corrugated paper sheet tends to detach from the corrugating roller in the path comprised between the corrugating nip and the pressure nip.

Various systems have been studied to reduce the risk of detachment of the corrugated paper sheet from the corrugating roller.

For example, GB 2170831 discloses a system, wherein an arched comb is arranged around the second corrugating roller, the comb extending from the first corrugating roller to the pressure roller and exerting a radial retention action, from the outside inwards, on the corrugated paper sheet in order to keep it adhering to the second corrugating roller. This system has many drawbacks, in particular in case of breakage of the paper sheet.

EP 0092079 discloses a single facer wherein, to keep the corrugated paper sheet adhering to the second corrugating roller, a pressure system is used that, through pressurized air, applies a pushing action against the outer surface of the corrugated paper sheet. The generated airflow causes drawbacks. For example, it tends to draw glue residues that are thus dispersed in the surrounding environment.

U.S. Pat. No. 4,368,094 discloses a single facer wherein, to keep paper adhering to the second corrugating roller in the path between the corrugating nip and the pressure nip, annular grooves in the second corrugating roller are depressurized through suction ducts. The system is particularly complex and entails high thermal losses due to the need of sucking a great quantity of air in the area surrounding the corrugating roller. This latter is heated to facilitate corrugating and gluing. The presence of suction ducts results in a loss of thermal energy from the corrugating rollers and therefore negatively affects the energy consumption of the machine.

A single facer with a different suction system is disclosed in U.S. Pat. No. 4,251,313.

U.S. Pat. No. 4,581,095 discloses a single facer where two suction boxes are associated with the second corrugating roller, one adjacent to the corrugating nip and the other adjacent to the pressure nip, generating a suction in annular grooves provided in the second corrugating roller in order to keep the corrugated paper sheet on the surface of the second corrugating roller. In this case again, even if sealing systems are provided, there is a high air consumption with consequent heat removal from the corrugating roller. Moreover, the detachment of the single face corrugated paperboard from the corrugating roller is particularly difficult and there are frequent breakages of the single face corrugated paperboard, with consequent jam of the single facer.

U.S. Pat. No. 4,618,394 discloses a single facer comprising a first corrugating roller with a first series of flutes or teeth and a second corrugating roller with a second series of flutes or teeth. The two series of flutes of the two corrugating rollers mesh with one another in a corrugating nip. The second corrugating roller comprises a series of annular grooves. A pressing roller co-acts with the second corrugating roller, defining a pressure nip where the corrugated first paper sheet is glued to the smooth second paper sheet. In this case, in order to keep the corrugated first paper sheet adhering to the surface of the second corrugating roller, a suction box is provided, extending approximately parallel to the axis of the second corrugating roller and defining a suction area around the second corrugating roller. The suction box is arranged adjacent the corrugating nip, downstream of the pressing roller and upstream of the first corrugating roller with respect to the direction of rotation of the second corrugating roller. The suction box generates a suction in the annular grooves, keeping the first paper sheet adhering to the second corrugating roller. The single face corrugated paperboard is detached from the second corrugating roller at the pressure nip by means of foils entering in the annular grooves and arranged between the suction box and the pressing roller. The foils are distanced from the suction box and extend under the corrugated paperboard up to the nip between the second corrugating roller and the pressing roller. These also limit the area where the suction is generated through the suction box.

This known system still has drawbacks, in particular due to the air consumption and, thus, to the consequent thermal losses. Moreover, the conditions under which the corrugated paper sheet and the smooth paper sheet are glued together are not optimal. Also detaching the single face corrugated paperboard from the corrugating roller downstream of the pressure or gluing nip is difficult.

A need therefore exists for further improving the single facers to alleviate or overcome, the drawbacks of the current art.

SUMMARY

According to an aspect, in order to alleviate or overcome one or more drawbacks of the single facers of the current art, a single facer is provided comprising a first corrugating roller with a first series of flutes or teeth and a second corrugating roller with a second series of flutes or teeth. The first corrugating roller and the second corrugating roller mesh with one another with the respective series of flutes in a corrugating nip, through which a first paper sheet passes to be fluted. The single facer also comprises a pressing member co-acting with the second corrugating roller and forming a pressure or gluing nip therewith. In embodiments described herein, the pressing member can include a pressing roller pushed against the crests of the flutes of the second corrugating roller.

A glue applicator co-acts with the second corrugating roller and is arranged downstream of the first corrugating roller and upstream of the pressing member with respect to the direction of rotation of the second corrugating roller. Downstream of the pressing member and upstream of the first corrugating roller, with respect to the direction of rotation of the second corrugating roller, a suction box is also arranged, extending approximately parallel to the axis of the second corrugating roller. The suction box defines a suction area around the second corrugating roller.

Conveniently, the second corrugating roller comprises a plurality of annular grooves, in each of which a respective laminar member is inserted. The laminar members are positioned between the pressing member and the first corrugating roller, in particular downstream of the pressing member and upstream of the first corrugating roller, with respect to the direction of rotation of the second corrugating roller. Practically, the laminar members are positioned around the second corrugating roller, between the pressure nip and the suction box. The laminar members are preferably aligned to one another according to an alignment direction parallel to the rotation axis of the second corrugating roller. Each laminar member extends in the respective annular groove towards the suction box.

The laminar members form a sealing inside the respective annular grooves, which reduces the consumption of air sucked by the suction box, thus reducing the thermal power losses. As the laminar members extend towards the suction box, they minimize the airflow necessary to generate a sufficient suction degree for keeping the corrugated paper sheet adhering to the surface of the second corrugating roller.

In practice, the laminar members form a sealing inside the annular grooves immediately upstream of the suction box with respect to the direction of rotation of the second corrugating roller, i.e. a sealing adjacent the suction box.

In single facers of the current art (see e.g. U.S. Pat. No. 4,618,394), foils are arranged in annular grooves at the exit side of the pressure nip, to provide a sealing action in the position where the single face corrugated paperboard leaves the second corrugating roller. Conversely, the laminar members disclosed herein provide a sealing action in the area where the first smooth paper sheet enters the corrugating nip, immediately upstream the suction box. As will become apparent from the following detailed description, this results in beneficial effects in terms of reduction of the energy consumption, as well as in terms of smoother operation of the single facer.

In advantageous embodiments, the single facer also comprises a guiding element for guiding the single face corrugated paperboard emerging from the pressure nip, or gluing nip. The guiding element can be a roller or a system of rollers. The guiding element co-acts with the second corrugating roller and with the pressing member so as to define a contact arch between the single face corrugated paperboard and the second corrugating roller downstream of the pressure nip, towards the suction box. Essentially, the guiding element, the second corrugating roller and the pressing member are so arranged that the feeding path of single face corrugated paperboard downstream of the pressure nip follows, for a given segment, the side surface of the second corrugating roller. Along this segment or contact arch, the corrugated paperboard sheet remains attached to the flutes of the second corrugating roller.

In some embodiments, this contact arch can extend for an angle preferably greater than 10°, for example comprised between approximately 10° and 140°, preferably greater than approximately 20° and lower than approximately 120°, more preferably equal to, or greater than, approximately 20° and equal to, or lower than, approximately 90°, for example comprised between approximately 30° and approximately 70°. In this way, the single face corrugated paperboard is kept in contact with the second corrugating roller, which is conveniently heated, for a time sufficient to optimize gluing between the smooth paper sheet and the corrugated paper sheet forming the single face corrugated paperboard. As will be clearly apparent from the detailed description of embodiments of the single facer, the contact arch between single face corrugated paperboard and second corrugating roller downstream of the pressure nip also has a positive effect as regards air consumption, and therefore it contributes to reduce the energy consumption. Moreover, as will be better explained below, it can facilitate detaching the single face corrugated paperboard from the corrugating roller.

Briefly, by means of the guiding member, the point where the single face corrugated paperboard is detached from the second corrugating roller is moved away from the pressure nip up to a point where the suction inside the annular grooves of the second corrugating roller is significantly reduced or null. This highly facilitates the detachment of single face corrugated paperboard from the first corrugating roller and reduces the quantity of air that shall be sucked to make the corrugated paper sheet adhere to the second corrugating roller. At the same time, the adhesion effect is also kept in the pressure nip and immediately downstream thereof, and this improves gluing conditions.

In the single facers of the current art, which make use of suction to keep the corrugated sheet adhering to the second corrugating roller, the detachment of the single face corrugated paperboard occurs immediately downstream of the pressure nip, i.e. the single face corrugated paperboard follows a trajectory tangent to the second corrugating roller at the pressure nip. This is required due to the presence of suction systems in the area where the single face corrugated paperboard is detached from the second corrugating roller. The detachment of the single face corrugated paperboard is made difficult by the fact that, in the point where the single face corrugated paperboard shall be detached from the corrugating roller, the suction effect is still very strong.

Vice versa, according to embodiments described herein, the suction area of the annular grooves is prolonged downstream of the pressure nip, keeping the annular grooves radially closed outwards through the single face corrugated paperboard that remains adhering to the second corrugating roller for a relatively long arch of contact thanks to the guiding member. The point where the single face corrugated paperboard is detached is far from the pressure nip; in this way detachment is easier and there is a reduction in the air flow that shall be sucked through the annular grooves to have the adhesion effect of the corrugated paper sheet to the corrugating roller.

In some advantageous embodiments, the laminar members are mounted floating, so as to adapt to the thermal expansions of the second corrugating roller. For example, each laminar member can have a mounting hole, where a mounting rod enters. The hole can have a greater diameter than the diameter of the rod, so as to leave sufficient clearance between the mounting rod and each laminar member. The floating mounting allows each laminar member to move sufficiently to follow the thermal expansions of the corrugating roller, without generating mechanical stresses or excessive contact forces between the laminar member and the bottom of the groove where it is housed.

In order to achieve greater efficiency, in some embodiments a sealing member is associated with the suction box, the sealing member co-acting with the flutes of the second corrugating roller; the sealing member can be arranged upstream of the suction box with respect to the direction of rotation of the second corrugating roller and directly adjacent to the suction box. The sealing member can comprise, for example, one or more small blocks made of a material with low friction coefficient, for instance polytetrafluoroethylene (PTFE), or any other material with an equivalent friction coefficient. The sealing member can be pressed against the flutes of the second corrugating roller so as to seal them. The sealing member can have, for example, a cylindrical contact surface, whose radius is equal to the radius of the cylinder enveloping the flutes of the second corrugating roller. The dimension of the sealing member in circumferential direction can be such that the sealing member is in simultaneous contact with two or more flutes of the second corrugating roller, for example three or more flutes, preferably four or more flutes of the corrugating roller.

In some embodiments, to achieve a better sealing and to adapt to any thermal expansion of the corrugating roller, the sealing member is resiliently biased against the flutes of the second corrugating roller.

In some embodiments, the laminar members extend inside the respective grooves under the sealing member, i.e. the laminar members extend in the respective annular grooves in the area where the sealing member is in contact with the flutes of the second corrugating roller. In this way, an effective sealing is achieved and the airflow rate necessary to generate in the annular grooves the suction level necessary for keeping the corrugated first paper sheet adhering to the second corrugating roller is reduced.

In practical embodiments, each laminar member has a radially outer edge in contact with the sealing member. The radially outer edge can be shaped like an arc. The reciprocal contact between the radially outer edge of the laminar members and the sealing member further reduces the amount of air that shall be sucked to have a sufficient level of vacuum in the annular grooves, thus reducing heat losses. Each laminar member preferably comprises also a continuous or discontinuous radially inner edge adapted to slide on a bottom of the respective groove. The radially inner edge can be used for scraping and cleaning the bottom of the annular groove. A discontinuous radially inner edge reduces the contact and sliding surface between laminar member and annular groove, thus reducing losses due to friction.

An appendix can extend from the radially outer edge, shaped like an arc, of each laminar member, the appendix defining a detachment edge of the single face corrugated paperboard from the second corrugating roller. The detachment edge can form one of the sides of an appendix of the respective laminar member, the appendix forming also an element for mounting the laminar member to a support structure, for example a crossbar that can also support the suction box. The detachment edge formed by each laminar member is arranged upstream of the suction box and downstream of the pressure nip with respect to the direction of rotation of the second corrugating roller.

According to a further aspect, a method is disclosed herein for producing single face corrugated paperboard with a single facer as defined above, the method comprising the following steps:

supplying a smooth first paper sheet to the corrugating nip and forming a plurality of flutes in the first paper sheet;

by means of the glue applicator, applying glue on the flutes formed in the first paper sheet;

supplying the corrugated first paper sheet and a smooth second paper sheet to the pressure nip between the second corrugating roller and the pressing member and gluing together the first paper sheet and the second paper sheet thus forming a single face corrugated paperboard;

detaching the single face corrugated paperboard from the second corrugating roller;

wherein the first paper sheet is kept adhering to the second corrugating roller, at least between the corrugating nip and the pressure nip, through a depressurization in the annular grooves of the second corrugating roller generated by the suction box.

Further aspects and features of the single facer and the method described herein will be illustrated hereunder with reference to an embodiment and are defined in the appended claims, which form an integral part of the present description.

BRIEF DESCRIPTION OF THE DRAWINGS

The invention will be better understood by following the description and the accompanying drawing, which shows a non-limiting example of embodiment of the invention. More in particular, in the drawing.

DETAILED DESCRIPTION OF AN EMBODIMENT

The detailed description below of example embodiments is made with reference to the attached drawing. The same reference numbers in different figures identify equal or similar elements. Moreover, the drawings are not necessarily to scale. The detailed description below does not limit the invention. The protective scope of the present invention is defined by the attached claims.

In the description, the reference to "an embodiment", "the embodiment", or "some embodiments" means that a particular feature, structure or element described with reference to an embodiment is comprised in at least one embodiment of the described subject matter. The sentences "in an embodiment" or "in the embodiment" or "in some embodiments" in the description do not therefore necessarily refer to the same embodiment or embodiments. The particular features, structures or elements can be furthermore combined in any suitable way in one or more embodiments.

Figure 1:
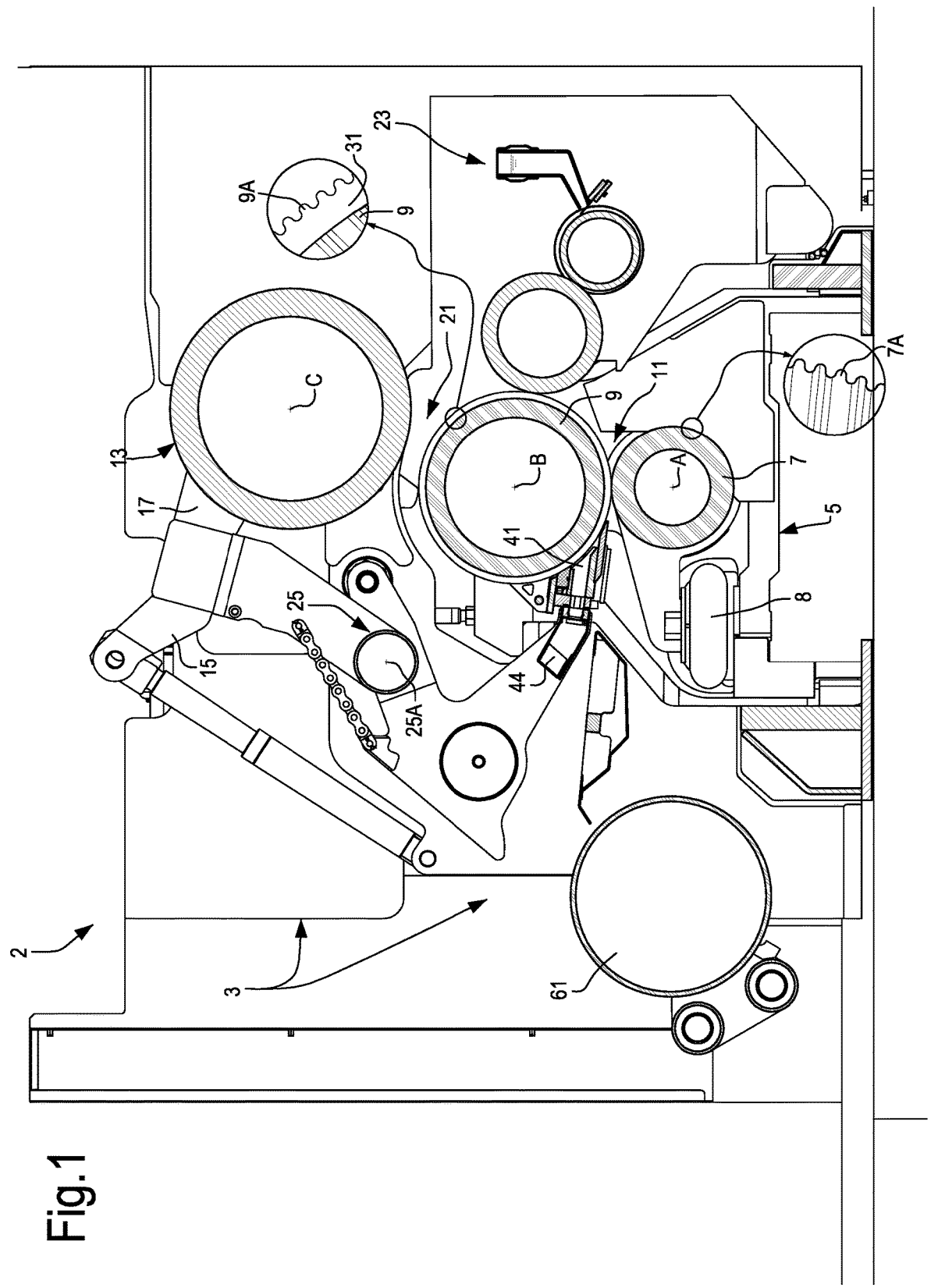
FIG. 1 is a view and schematic side cross-section of a single facer according to the present description in non-operating conditions.
Figure 2:
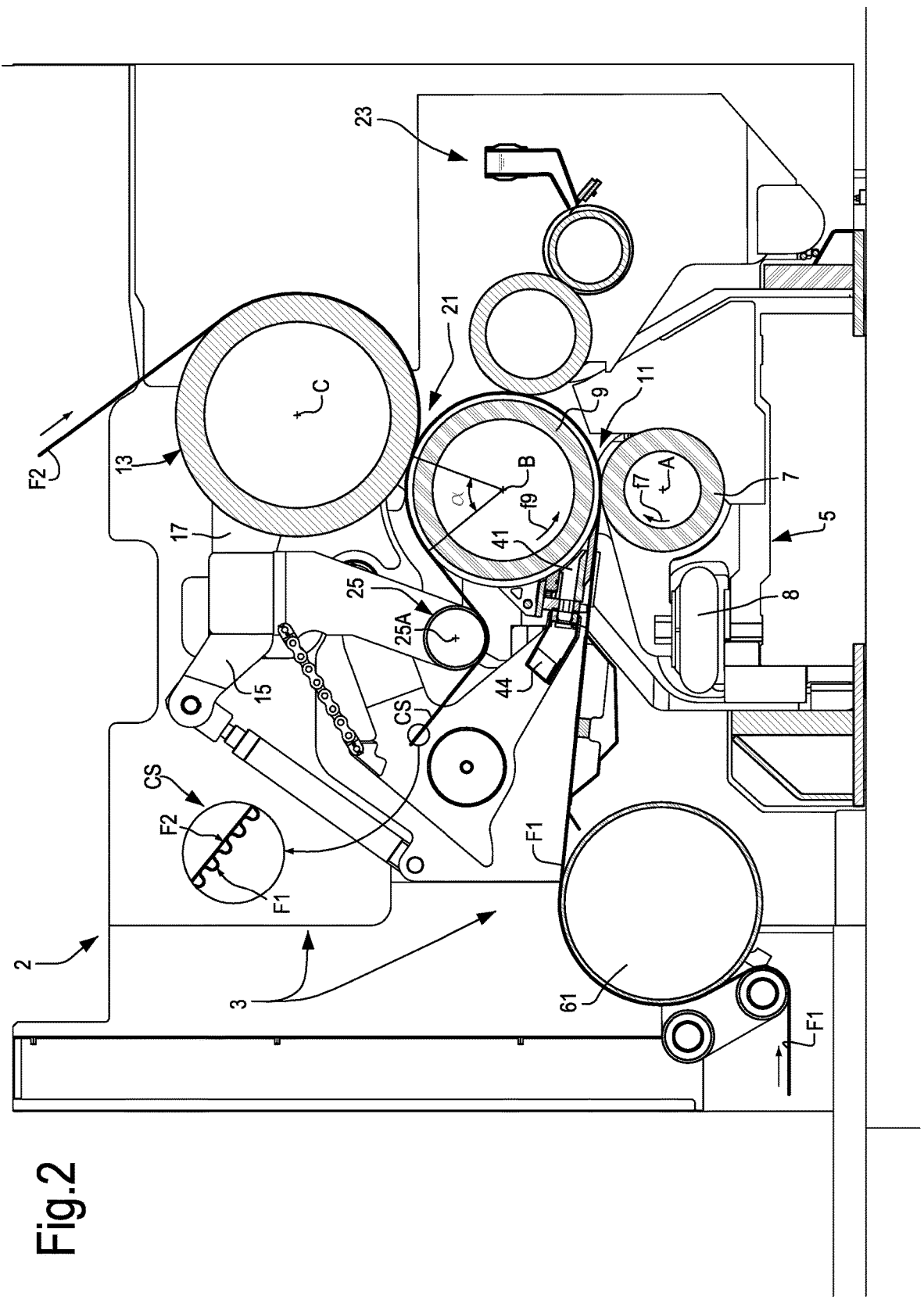
FIG. 2 is the view of FIG. 1 with the single facer in operating conditions.

FIG. 1 shows a schematic side view and partial cross-sectional view of a single facer 2 in a non-operating condition, whilst FIG. 2 shows the same view in operating conditions. In FIG. 1, the rollers of the single facer 2 are open, and the path of paper sheets is not shown, whilst in FIG. 2 the rollers are closed in working position, and the paper sheets move along their paths through the single facer.

The single facer 2 comprises a bearing structure 3, where there is arranged a, possibly removable unit 5 of corrugating rollers, which can be interchangeable. More in particular, the single facer 2 comprises a first corrugating roller 7 and a second corrugating roller 9. A corrugating nip 11 is defined between the two corrugating rollers 7 and 9.

The first corrugating roller 7 comprises an engraved cylindrical surface forming a first series of flutes or teeth 7A (see the enlargement in FIG. 1). The second corrugating roller 9 comprises an engraved cylindrical surface forming a second series flutes or teeth 9A (see FIGS. 1, 3, 4). In the corrugating nip 11, the first corrugating roller 7 and the second corrugating roller 9 co-act, i.e. the flutes 7A of the first corrugating roller 7 mesh with the flutes 9A of the second corrugating roller. In this way, a smooth paper sheet fed through the corrugating nip 11 is deformed and takes a fluted shape. The two corrugating rollers 7 and 9 are pressed against each other in the corrugating nip 11, and to this end an actuator 8 can be provided, for example.

Referring again to FIGS. 1 and 2, the letter A indicates the rotation axis of the first corrugating roller 7 and the letter B indicates the rotation axis of the second corrugating roller 9. The two rotation axes A and B are substantially parallel. Arrow f7 indicates the direction of rotation of the first corrugating roller 7 and arrow f9 indicates the direction of rotation of the second corrugating roller 9.

A pressing member 13 co-acts with the second corrugating roller 9. In the illustrated embodiment, the pressing member 13 comprises a pressing roller rotating around a rotation axis C, substantially parallel to the rotation axis A of the first corrugating roller 7 and to the rotation axis B of the second corrugating roller 9. The pressing member 13 can be supported by a pivoting arm 15, hinged to the bearing structure, and can be pressed against the crests of the flutes 9A of the second corrugating roller 9 by an actuator or an actuator system known per se. An example of an actuation system for the pressing roller is disclosed in U.S. Pat. No. 8,714,223.

A pressure nip 21 is defined in the area of reciprocal pressure between the pressing member 13 and the second corrugating roller 9. In the pressure nip 21, the cylindrical surface of the pressing roller 13 is pressed against the crests of the flutes 9A of the second corrugating roller 9.

The fluted cylindrical surface of the second corrugating roller 9 is therefore subdivided into two portions, the first of which extends from the corrugating nip 11 to the pressure nip 21, and the second of which extends from the pressure nip 21 to the corrugating nip 11. A first paper sheet F1, coming from a (not shown) unwinder is fed to the corrugating nip 11 and guided around the second corrugating roller 9 along the portion thereof comprised between the corrugating nip 11 and the pressure nip 21. Thus, during operation, the first portion of the cylindrical surface of the second corrugating roller 9 is wrapped by the paper sheet F1, whilst the second portion of this cylindrical surface is free.

A glue applicator 23 is arranged along the first portion of the fluted cylindrical surface of the second corrugating roller 9, I. e. along the path of the paper sheet F1 around the second corrugating roller 9, the glue applicator being configured to apply a glue to the crests of flutes formed in the paper sheet F1 due to the effect of the deformation imparted to the paper sheet F1 in the corrugating nip 11.

A smooth second paper sheet F2 is fed around the pressing member 13. Similarly to the first sheet F1, also the second sheet F2 is delivered by an unwinder (not shown). The second sheet is intended to be glued to the first paper sheet F1 in the pressure nip 21. The second paper sheet F2 is also called "liner". The composite sheet formed by the corrugated first paper sheet F1 and by the smooth second paper sheet F2 constitutes a single face corrugated paperboard, indicated with CS, which is detached from the second corrugating roller 9 at a point arranged at a certain angular distance from the pressure nip 21.

In order that the single face corrugated paperboard CS (FIG. 2) is detached from the second corrugating roller 9 in a position far from the pressure nip 21, i.e. at a certain distance from the point of reciprocal pressure between the pressing member 13 and the second corrugating roller 9, the single facer 2 comprises a guiding element 25, for example a guiding roller 25, having an axis 25A that is substantially parallel to the rotation axes A, B and C of the first corrugating roller 7, of the second corrugating roller 9 and of the pressing roller 13. The guiding roller 25 can be carried by the arm 15 or by a separate support element constraint to the bearing structure 3 of the single facer 2. The reciprocal position between the guiding roller 25 and the pressing roller 13 can be adjusted in order to modify the extension of the contact arc between the single face corrugated paperboard CS and the second corrugating roller 9. The contact arc is subtended by an angle α, that in some embodiments can be comprised between 20° and 90°, for example The contact arc between the single face corrugated paperboard CS and the second corrugating roller 9 extends the time during which the single face corrugated paperboard CS is in contact with the second corrugating roller 9. This time is useful for the mutual gluing of the corrugated paper sheet F1 and the smooth paper sheet F2, as well as for other purposes that will be explained below.

Figure 3:
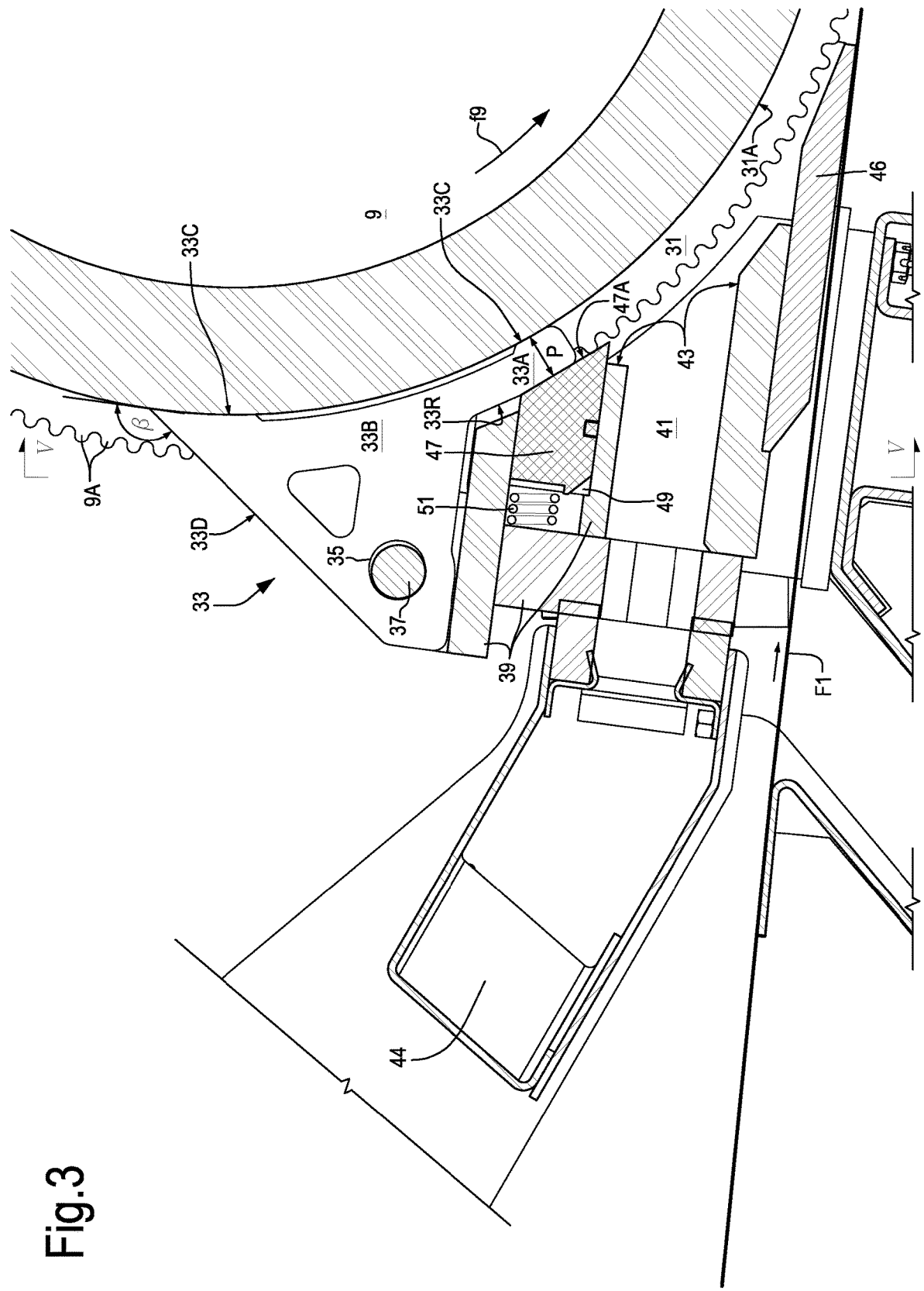
FIG. 3 is an enlarged cross-section, according to a plane with trace in FIG. 5, orthogonal to the axis of the corrugating rollers and passing through an annular groove, of the second corrugating roller and of the suction box.
Figure 5:
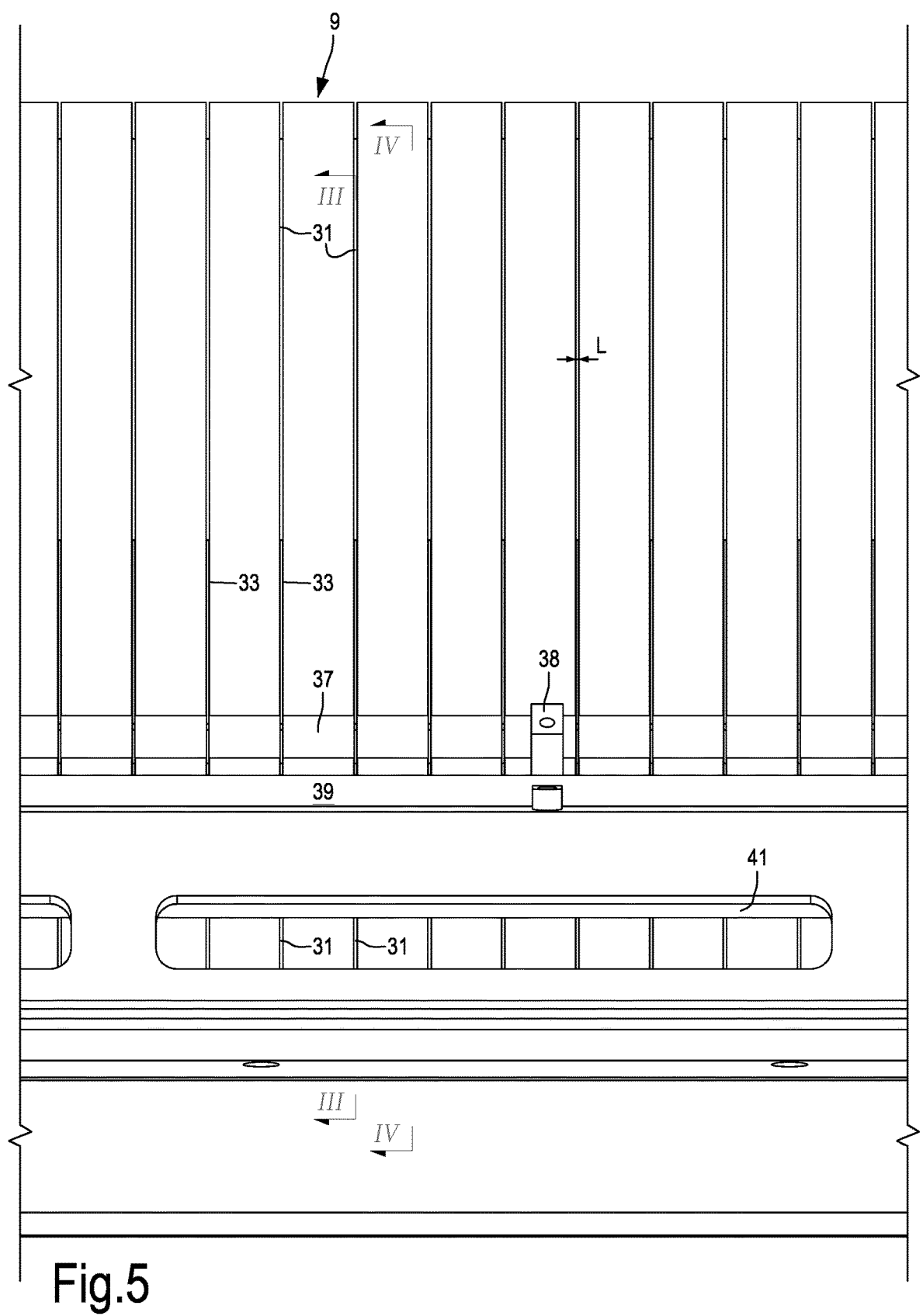
FIG. 5 is a front view according to V-V of FIGS. 3 and 4.

As shown in particular in FIGS. 3 and 5, the second corrugating roller 9 comprises a plurality of annular grooves 31. The annular grooves 31 can be uniformly distanced along the axial extension of the second corrugating roller 9, i.e. along the direction of the rotation axis B of the second corrugating roller 9. The annular grooves 31 have a depth P in radial direction and a width L in axial direction. Reference number 31A indicates the bottom of each annular groove 31.

Figure 4:
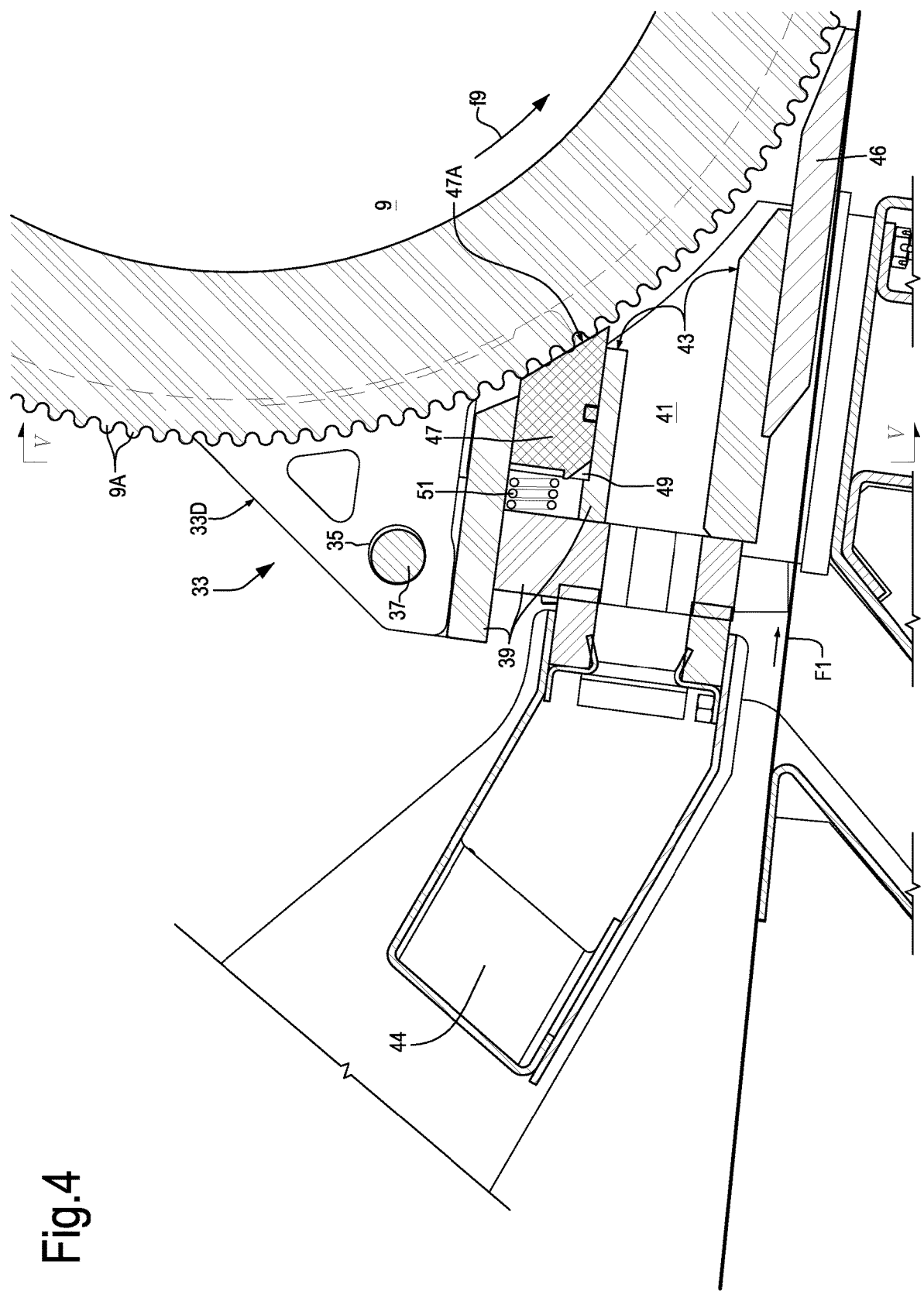
FIG. 4 is an enlarged cross-section, analogous to FIG. 3, according to a plane with trace IV-IV in FIG. 5, orthogonal to the axis of the corrugating rollers and passing through two adjacent annular grooves, of the second corrugating roller and of the suction box.

A respective laminar member 33 is inserted in each annular groove 31 (FIGS. 3 and 4). The laminar members 33 are aligned with one another according to a direction parallel to the rotation axis B of the second corrugating roller 9 (FIG. 5). The laminar members 33 are arranged along the portion of the second corrugating roller 9 free of the paper sheet F1, i.e. the portion extending downstream of the pressure nip 21 and upstream of the corrugating nip 11 with respect to the direction of rotation f9 of the second corrugating roller 9.

The laminar members 33 can be formed by portions of cut metal sheet. The thickness thereof can be slightly smaller than the width L of the annular grooves 31. For example, the thickness of the laminar members 33 can be one or two tenths of millimeter smaller than the width L. Preferably, for the sake of construction simplicity, all the laminar members 33 have the same thickness and all the annular grooves 31 have the same width, even if this is not strictly necessary.

Each laminar member 33 comprises an arched portion 33A housed inside the respective annular groove 31, and a portion 33B, projecting from the annular groove 31, shown in particular in FIG. 3. The portion 33A of each laminar member 33 arranged inside the respective annular groove 31 forms a radially inner edge 33C, which is at least partially in sliding contact with the bottom 31A of the corresponding annular groove 31. In the illustrated embodiment, the edge 33C is only partially in contact with the bottom 31A of the annular groove 31, in order to reduce the friction between the laminar member 33 and the bottom 31A of the annular groove 31.

The portion 33B of each laminar member 33, projecting outside the respective annular groove 31, forms a connection to a support element common to all the laminar members 33. In the illustrated embodiment, each laminar member 33 has, in the portion 33B, a hole 35 where a rod 37, which is fixed to a crossbar 39 substantially parallel to the rotation axis B of the second corrugating roller 9, enters. By removing the rod 37 from constraints through which it is fixed to the crossbar 39, the laminar members 33 can be removed, for example for replacement when worn or broken.

In some embodiments, as shown in the drawing, the portion 33B of each laminar member 33 can have an approximately triangular or trapezoid shape and can form an edge 33D, extending outside the respective annular groove 31. The edge 33D faces upstream with respect to the direction of rotation f9 of the second corrugating roller 9. Advantageously, the edge 33D forms, together with the tangent to the cylindrical surface (representing the envelope of the flutes 9A of the second corrugating roller 9) an angle β, preferably greater than 90°, more preferably equal to, or greater than 120°, for the purposes that will be explained below. Hereunder, the edge 33D will be referred to as "detachment edge" for the function it has, as illustrated below.

In some embodiments, the hole 35 of each laminar member 33 has a greater diameter than that of the rod 37. In this way, the laminar members 33 are mounted floating and can move in a limited manner with respect to the crossbar 39, to follow any thermal expansion of the corrugating roller 9 without generating stresses.

A suction box 41 is arranged around the second corrugating roller 9, between the series of laminar members 33 and the first corrugating roller 7, the suction box being connected to a suction duct 44. The suction box 41 has an extension parallel to the rotation axis B of the second corrugating roller 9 and substantially extends for the whole axial dimension of this roller. The suction box 41 has a suction mouth 43 that can be continuous or discontinuous, facing the cylindrical surface of the second corrugating roller 9. The suction box 41 can be supported by the same crossbar 39 supporting the laminar members 33. With the suction box 41 a plate 46 is associated, along which the paper sheet F1 fed to the corrugating nip 11 slides.

The suction box 41 can be fastened to the removable unit 5, onto which the corrugating rollers 7 and 9 are mounted.

Advantageously, a sealing member 47 is associated with the suction box 41. The sealing member 47 is arranged upstream of the suction mouth 43 of the suction box 41 with respect to the direction of rotation 19 of the second corrugating roller 9. The sealing member 47 can comprise, for example, one or more small blocks made of PTFE or other material with low friction coefficient. The sealing member 47 can be housed in a seat 49 provided in the crossbar 39. Resilient members 51 can be provided, to bias the sealing member 47 against the flutes 9A of the second corrugating roller 9.

Advantageously, the sealing member 47 can have a cylindrical contact surface 47A, whose diameter is substantially equal to the diameter of the surface enveloping the crests of the flutes 9A of the second corrugating roller 9. Practically, the sealing member 47 is resiliently pressed by the resilient members 51, with the contact surface 47 against the crests of the flutes 9A of the second corrugating roller 9. In practical embodiments, the cylindrical surface 47A of the sealing member 47 extends in the circumferential direction of the second corrugating roller 9 so as to cover at least two, preferably three or four crests of respective flutes 9A of the second corrugating roller 9.

The suction box 41, the crossbar 39, the laminar members 33 and the sealing member 47 can be integral with the removable unit 5, on which the corrugating rollers 7 and 9 are mounted, so as to be extracted therewith. The suction duct 44 can be supported by the stationary bearing structure 3, inside which the unit 5 can be selectively inserted. The suction duct 44 can be movable, for example pivoting around a rotation axis fixed with respect to the bearing structure 3, so as to take alternatively a position where it is pneumatically coupled to the suction box 41, or a position where it is released from the suction box 41. In this second position, the suction box 41 can be removed, with the unit 5, from the bearing structure 3, for example for replacing the unit 5 with a different unit 5 provided with a different pair of corrugating rollers 7, 9. The interchangeability of the unit 5, also called cartridge, allows easily adapting the single facer 3 to the production of sheets of single face corrugated paperboard CS with different flute shapes.

The arched portion 33A of each laminar member 33 extends between the bottom 31A of the respective annular groove 31 and the sealing member 47. In some embodiments, the arched portion 33A of each laminar member 33 has such a radial dimension that a radially outer edge 33R of the arched portion 33A is in contact with the contact surface 47A of the sealing member 47. Substantially, the radially outer edge 33R of each laminar member 33 can be on the geometrical cylindrical surface constituting the envelope of the crests of the flutes 9A of the second corrugating roller 9.

With this arrangement, a sealing is provided inside the annular grooves 31, formed by the laminar members 33 and by the sealing member 47, thus reducing the air suction upstream of the suction box 41 with respect to the direction of rotation f9 of the second corrugating roller 9.

The operation of the single facer 2 described above is as follows. During the production of single face corrugated paperboard CS, the first paper sheet F1 is fed through the corrugating nip 11 and can be heated by means of a heating roller 61, around which the first paper sheet F1 can be guided. Upstream of the corrugating nip 11, the first paper sheet F1 can be guided along the plate 46. In the corrugating nip 11, the first paper sheet F1 is deformed due to the action of the reciprocally engaging flutes 7A and 9A of the first corrugating roller 7 and of the second corrugating roller 9. The corrugating rollers 7 and 9 can be heated inside so as to keep the first paper sheet F1 in temperature. The corrugated first paper sheet F1 remains adhering to the second corrugating roller 9 along the portion of fluted cylindrical surface thereof extending from the corrugating nip 11 to the pressure nip 21. Along this segment of path of the paper sheet F1, the glue applicator 23 applies respective lines of glue on the crests of the flutes provided on the corrugated first paper sheet F1.

In the pressure nip 21, the second paper sheet F2 fed around the pressing roller 13 is pressed against the flutes formed in the first paper sheet F1, due to the pressure with which the pressing roller 13 presses against the flutes 9A of the first corrugating roller 9. The pressing roller 13 can be internally heated. The paper sheet F2 can be pre-heated, upstream of the pressing roller 13, by suitable heating members, known and not shown.

Pressure and temperature causes the adhesion of the corrugated first paper sheet F1 and the smooth second paper sheet F2, thus producing a continuous single face corrugated paperboard exiting from the pressure nip 21. The presence of the guiding member 25 extends the segment along which the single face corrugated paperboard CS remains in contact with the second corrugating roller 9. This improves gluing and reduces the pressure necessary in the pressure nip 21.

Due to the suction generated by the suction box 41, depressurization occurs inside the annular grooves 31, i.e. there is a lower pressure than the atmospheric pressure. This suction also propagates between the paper sheet F1 and the surface of the flutes 9A of the second corrugating roller 9, thanks to the presence of the plate 46.

This air suction is ensured by the action of the suction box 41, as well as by the sealing upstream of the suction box 41 performed by the sealing member 47 and the laminar members 33 and by the fact that the annular grooves 31 are radially closed outwards by the paper sheet F1 in the area from the corrugating nip 11 to the pressure nip 21.

In fact, downstream of the suction box 41, the first paper sheet F1 externally closes the annular grooves 31, thus ensuring that the suction by the suction box 41 keeps a suitable lower pressure inside the annular grooves 31. The extent of this lower pressure, i.e. the difference between the pressure outside the annular grooves 31 and the pressure inside them, decreases along the circumferential extension of the annular grooves 31 from the position where the suction box 41 is provided towards the position where the single face corrugated paperboard CS is detached from the second corrugating roller 9. From the detachment point up to the position where the suction box 41 is provided, the pressure inside the annular grooves 31 is equal to the ambient pressure, as the annular grooves 31 are radially outwardly open.

Thanks to the fact that the contact between the second corrugating roller 9 and the single face corrugated paperboard CS extends behind the pressure nip 21, it is possible not only to have a better gluing, but also a better adhesion of the first paper sheet F1 to the second corrugating roller 9. In fact, contrarily to what occurs in the single facers of the current art, by extending the arc of contact between the single face corrugated paperboard CS and the second corrugating roller 9 beyond the pressure nip 21, there will still be a suction effect in this latter through the annular grooves 31. The paper sheet F1 therefore correctly adheres to the second corrugating roller 9 even beyond the pressure or gluing nip 21.

Due to the pressure drop inside the annular grooves 31, the lower pressure quickly decreases downstream of the pressure nip 21 and, in the point where the single face corrugated paperboard CS detaches from the second corrugating roller 9, the pressure inside the annular grooves 31 is practically equal to the atmospheric pressure. This facilitates detaching the sheet of simple corrugated cardboard CS from the second corrugating roller 9.

Moreover, thanks to the fact that in the point where the single face corrugated paperboard CS is detached from the second corrugating roller 9, the suction effect is practically null, it is not necessary to provide for a sealing member in this position, and the quantity of air sucked in this position is practically zero.

Should the single face corrugated paperboard CS continue to adhere to the outer cylindrical surface of the second corrugating roller 9 due to the residual lower pressure inside the annular grooves 31, it would be transported up to the point where the detachment edges 33D of the laminar members 33 project from the annular grooves 31. As the detachment edges 33D form an obtuse angle β with the tangent to the enveloping cylindrical surface of the flutes 9A, they easily detach the single face corrugated paperboard CS from the flutes 9A of the second corrugating roller 9, thus avoiding stresses and risks of breakages or damages of the single face corrugated paperboard CS.

The above-described arrangement therefore allows, through suction, an effective effect of keeping the corrugated paper sheet F1 on the fluted cylindrical surface of the second corrugating roller 9 from the corrugating nip 11 up to the pressure nip 21, with a substantial reduction in the required airflow rate. This consequently decreases the amount of heat removed from the second corrugating roller 9 and the energy consumption. Moreover, the particular arrangement of the path of the single face corrugated paperboard CS facilitates the detachment thereof without the risk of breakages and consequently jams of the single facer 2.

The invention claimed is:

1. A single facer comprising:
   a first corrugating roller with a first rotation axis and a side surface provided with a series of flutes;
   a second corrugating roller with a second rotation axis and a side surface provided with a series of flutes; wherein the first corrugating roller and the second corrugating roller form a corrugating nip therebetween; and wherein the second corrugating roller comprises a series of annular grooves;
   a pressing member, co-acting with the second corrugating roller and forming a pressure nip therewith;
   a glue applicator, co-acting with the second corrugating roller;
   a suction box extending approximately parallel to the second rotation axis of the second corrugating roller and defining a suction area around the second corrugating roller;
   a series of laminar members, each of which is inserted in a respective one of said annular grooves of the second corrugating roller, the laminar members being arranged between the pressing member and the first corrugating roller and extending in respective ones of the annular grooves towards the suction box, such as to provide a sealing inside the annular grooves directly upstream of the suction box with respect to a direction of rotation of the second corrugating roller; wherein a sealing member is associated with the suction box and co-acts with the flutes of the second corrugating roller; and wherein the sealing member is resiliently biased against the flutes of the second corrugating roller.

2. The single facer of claim 1, wherein the laminar members extend in the respective ones of the annular grooves towards the corrugating nip up to the suction box.

3. The single facer of claim 1, further comprising a guiding element to guide a single face corrugated paperboard exiting from the pressure nip, the guiding element co-acting with the second corrugating roller and with the pressing member and being adapted to define a contact arch between the single face corrugated paperboard and the second corrugating roller downstream of the pressure nip, towards the suction box.

4. The single facer of claim 1, wherein each of the laminar members comprises an arched portion housed inside a respective one of the annular grooves, and a portion projecting from the respective one of the grooves and having a detachment edge facing upstream with respect to the rotation direction of the second corrugating roller.

5. The single facer of claim 1, wherein the laminar members are mounted floating, so as to adapt to thermal expansions of the second corrugating roller.

6. The single facer of claim 1, wherein a sealing member is associated with the suction box and co-acts with the flutes of the second corrugating roller.

7. The single facer of claim 6, wherein the sealing member comprises a contact surface adapted to be in sliding contact with the flutes of the second corrugating roller.

8. The single facer of claim 1, wherein each of the laminar members has a radially inner edge, adapted to slide on a bottom of each of the respective ones of the annular groove.

9. The single facer of claim 1, wherein the pressing member comprises a pressing roller.

10. A method for producing single face corrugated paperboards with a single facer as claimed in claim 8, comprising steps as follows:
supplying a first paper sheet to the corrugating nip and forming a plurality of flutes in the first paper sheet;
applying glue on the flutes formed in the first paper sheet by the glue applicator;
supplying the first paper sheet after the corrugating nip and a smooth second paper sheet to the pressure nip between the second corrugating roller and the pressing member and gluing together the first paper sheet and the second paper sheet thus forming a single face corrugated paperboard;
detaching the single face corrugated paperboard from the second corrugating roller;
wherein the first paper sheet is kept adhering to the second corrugating roller, at least between the corrugating nip and the pressure nip, by suction in the annular grooves of the second corrugating roller generated by the suction box.

11. The method according to claim 10, wherein the single face corrugated paperboard is kept in contact with a surface of the second corrugating roller for a contact arch extending downstream of the pressure nip towards the suction box, the laminar members being arranged downstream of a detachment point where the single face corrugated paperboard is detached from the second corrugating roller.

12. A single facer comprising:
a first corrugating roller with a first rotation axis and a side surface provided with a series of flutes;
a second corrugating roller with a second rotation axis and a side surface provided with a series of flutes; wherein the first corrugating roller and the second corrugating roller form a corrugating nip therebetween; and wherein the second corrugating roller comprises a series of annular grooves;
a pressing member, co-acting with the second corrugating roller and forming a pressure nip therewith;
a glue applicator, co-acting with the second corrugating roller;
a suction box extending approximately parallel to the second rotation axis of the second corrugating roller and defining a suction area around the second corrugating roller;
a series of laminar members, each of which is inserted in a respective one of said annular grooves of the second corrugating roller, the laminar members being arranged between the pressing member and the first corrugating roller and extending in respective ones of the annular grooves towards the suction box, such as to provide a sealing inside the annular grooves directly upstream of the suction box with respect to a direction of rotation of the second corrugating roller; wherein a sealing member is associated with the suction box and co-acts with the flutes of the second corrugating roller; and wherein the laminar members extend inside the annular grooves under the sealing member.

13. The single facer of claim 12, wherein the sealing member has an extension in a circumferential direction of the second corrugating roller such as to press against a plurality of flutes of the second corrugating roller.

14. The single facer of claim 12, wherein the laminar members extend in the respective ones of the annular grooves towards the corrugating nip up to the suction box.

15. The single facer of claim 12, further comprising a guiding element to guide a single face corrugated paperboard exiting from the pressure nip, the guiding element co-acting with the second corrugating roller and with the pressing member and being adapted to define a contact arch between the single face corrugated paperboard and the second corrugating roller downstream of the pressure nip, towards the suction box.

16. The single facer of claim 12, wherein each of the laminar members comprises an arched portion housed inside a respective one of the annular grooves, and a portion projecting from the respective one of the grooves and having a detachment edge facing upstream with respect to the rotation direction of the second corrugating roller.

17. The single facer of claim 12, wherein the laminar members are mounted floating, so as to adapt to thermal expansions of the second corrugating roller.

18. The single facer of claim 12, wherein the sealing member comprises a contact surface adapted to be in sliding contact with the flutes of the second corrugating roller.

19. The single facer of claim 12, wherein each of the laminar members has a radially inner edge, adapted to slide on a bottom of each of the respective ones of the annular groove.

20. The single facer of claim 12, wherein the pressing member comprises a pressing roller.

21. A single facer comprising:
a first corrugating roller with a first rotation axis and a side surface provided with a series of flutes;
a second corrugating roller with a second rotation axis and a side surface provided with a series of flutes; wherein the first corrugating roller and the second corrugating roller form a corrugating nip therebetween; and wherein the second corrugating roller comprises a series of annular grooves;
a pressing member, co-acting with the second corrugating roller and forming a pressure nip therewith;
a glue applicator, co-acting with the second corrugating roller;
a suction box extending approximately parallel to the second rotation axis of the second corrugating roller and defining a suction area around the second corrugating roller;
a series of laminar members, each of which is inserted in a respective one of said annular grooves of the second corrugating roller, the laminar members being arranged between the pressing member and the first corrugating roller and extending in respective ones of the annular grooves towards the suction box, such as to provide a sealing inside the annular grooves directly upstream of the suction box with respect to a direction of rotation of the second corrugating roller; wherein a sealing member is associated with the suction box and co-acts with the flutes of the second corrugating roller; and wherein the suction box and the sealing member are supported by a crossbar approximately parallel to the second rotation axis of the second corrugating roller and wherein the laminar members are carried on the crossbar.

22. The single facer of claim 21, wherein the laminar members are mounted on the crossbar by a removable rod, which defines a clearance allowing movement of the laminar members with respect to the crossbar.

23. The single facer of claim 21, wherein the laminar members extend in the respective ones of the annular grooves towards the corrugating nip up to the suction box.

24. The single facer of claim 21, further comprising a guiding element to guide a single face corrugated paperboard exiting from the pressure nip, the guiding element co-acting with the second corrugating roller and with the pressing member and being adapted to define a contact arch between the single face corrugated paperboard and the second corrugating roller downstream of the pressure nip, towards the suction box.

25. The single facer of claim 21, wherein each of the laminar members comprises an arched portion housed inside a respective one of the annular grooves, and a portion projecting from the respective one of the grooves and having a detachment edge facing upstream with respect to the rotation direction of the second corrugating roller.

26. The single facer of claim 21, wherein the laminar members are mounted floating, so as to adapt to thermal expansions of the second corrugating roller.

27. The single facer of claim 21, wherein the sealing member comprises a contact surface adapted to be in sliding contact with the flutes of the second corrugating roller.

28. The single facer of claim 21, wherein the sealing member has an extension in a circumferential direction of the second corrugating roller such as to press against a plurality of flutes of the second corrugating roller.

29. The single facer of claim 21, wherein each of the laminar members has a radially inner edge, adapted to slide on a bottom of each of the respective ones of the annular groove.

30. The single facer of claim 21, wherein the pressing member comprises a pressing roller.

31. A single facer comprising:
a first corrugating roller with a first rotation axis and a side surface provided with a series of flutes;
a second corrugating roller with a second rotation axis and a side surface provided with a series of flutes; wherein the first corrugating roller and the second corrugating roller form a corrugating nip therebetween; and wherein the second corrugating roller comprises a series of annular grooves;
a pressing member, co-acting with the second corrugating roller and forming a pressure nip therewith;
a glue applicator, co-acting with the second corrugating roller;
a suction box extending approximately parallel to the second rotation axis of the second corrugating roller and defining a suction area around the second corrugating roller;
a series of laminar members, each of which is inserted in a respective one of said annular grooves of the second corrugating roller, the laminar members being arranged between the pressing member and the first corrugating roller and extending in respective ones of the annular grooves towards the suction box, such as to provide a sealing inside the annular grooves directly upstream of the suction box with respect to a direction of rotation of the second corrugating roller; wherein a sealing member is associated with the suction box and co-acts with the flutes of the second corrugating roller; and wherein each of the laminar members has a radially outer edge in contact with the sealing member.

32. The single facer of claim 31, wherein the laminar members extend in the respective ones of the annular grooves towards the corrugating nip up to the suction box.

33. The single facer of claim 31, further comprising a guiding element to guide a single face corrugated paperboard exiting from the pressure nip, the guiding element co-acting with the second corrugating roller and with the pressing member and being adapted to define a contact arch between the single face corrugated paperboard and the second corrugating roller downstream of the pressure nip, towards the suction box.

34. The single facer of claim 31, wherein each of the laminar members comprises an arched portion housed inside a respective one of the annular grooves, and a portion projecting from the respective one of the grooves and having a detachment edge facing upstream with respect to the rotation direction of the second corrugating roller.

35. The single facer of claim 31, wherein the laminar members are mounted floating, so as to adapt to thermal expansions of the second corrugating roller.

36. The single facer of claim 31, wherein the sealing member comprises a contact surface adapted to be in sliding contact with the flutes of the second corrugating roller.

37. The single facer of claim 31, wherein the sealing member has an extension in a circumferential direction of the second corrugating roller such as to press against a plurality of flutes of the second corrugating roller.

38. The single facer of claim 31, wherein each of the laminar members has a radially inner edge, adapted to slide on a bottom of each of the respective ones of the annular groove.

39. The single facer of claim 31, wherein the pressing member comprises a pressing roller.

\* \* \* \* \*

UNITED STATES PATENT AND TRADEMARK OFFICE
CERTIFICATE OF CORRECTION

PATENT NO. : 10,618,242 B2
APPLICATION NO. : 16/151570
DATED : April 14, 2020
INVENTOR(S) : Mauro Adami Page 1 of 1

It is certified that error appears in the above-identified patent and that said Letters Patent is hereby corrected as shown below:

On the Title Page

Item (30) Foreign Application Priority Data "Oct. 5 2017 (IT) .............. MI2017A1820" should read -- Oct. 5 2017 (IT) .............. 102017000111820 --.

In the Claims

Column 13, Claim 10, Line 20, "boards with a single facer as claimed in claim 8, comprising" should read -- boards with a single facer as claimed in claim 1, comprising --.

Signed and Sealed this
Twenty-eighth Day of July, 2020

Andrei Iancu
*Director of the United States Patent and Trademark Office*